United States Patent [19]
Ozcelik et al.

[11] Patent Number: 5,612,745
[45] Date of Patent: Mar. 18, 1997

[54] METHOD AND APPARATUS FOR DETECTING OCCLUSION

[75] Inventors: Taner Ozcelik, San Jose, Calif.; James C. Brailean, Park Ridge; Aggelos K. Katsaggelos, Chicago, both of Ill.

[73] Assignee: Motorola, Inc., Schaumburg, Ill.

[21] Appl. No.: 505,991

[22] Filed: Jul. 24, 1995

[51] Int. Cl.$^6$ .................................................. H04N 7/36
[52] U.S. Cl. ........................ 348/416; 348/699; 348/700
[58] Field of Search ................................. 348/416, 699, 348/700; H04N 7/36

[56] References Cited

U.S. PATENT DOCUMENTS

| | | | |
|---|---|---|---|
| 4,727,422 | 2/1988 | Hinman | 348/416 |
| 4,771,331 | 9/1988 | Bierling | 348/396 |
| 4,989,087 | 1/1991 | Pele | 348/416 |
| 5,351,095 | 9/1994 | Kerdranvat | 348/699 |
| 5,500,685 | 3/1996 | Kokaram | 348/699 |

OTHER PUBLICATIONS

"Image Sequence Compresion Using a Pel–Recursive Motion–Compensated Technique" Robert J. Moorhead II, Sara a. Rajala, and Lawrence W. Cook, IEEE Journal on Selected Areas in Communications, vol., SAC–5, No. 7, Aug., 1987, pp. 1100–1114.

"The Efficiency of Motion–Compensating Prediction for Hybid Coding of Video Sequences" Bernd Girod, IEEE Journal on Selected Areas in Communications, vol. SAC–5, No. 7, Aug., 1987 pp. 1140–1154.

"Improvements of Transform Coding Algorithm for Motion– Compensated Interframe Prediction Errors—DCT/SQ Coding" Masahide Kaneko, Yosinori Hatori and Atsushi Koike, IEEE Journal on Selected Areas in Communications, vol. SAC–5, No. 7 Aug., 1987.

"Gradient–Based Algorithms for Block–Oriented MAP Estimation of Motion and Appplication to Motion–Compensated Temporatl Interpolation" Claude Bergeron and Eric Dubois, IEEE Transactions on Circuits and Systems for Video Technology, vol. 1, No. 1, Mar., '91 pp 72–85.

"Use of Colour Information in Bayesian Estimation of 2–D Motion" Janusz Konrad and Eric Dubois, INRS–Telecommunications, M17.23, pp. 2205–2208.

"Motion–Compensated Filtering of Tiime–Varying Images" Eric Dubois, INRS–Telecommuincations, May, 1991, pp. 103–131.

"Comparison of Stochastic and Deterministic Solution Methods in Bayesian Estimation of 2D Motion", Janusz Konrad and Eric Dubois, INRS–Telecommunications, vol. 9, No. 4, Aug., 1991, pp. 215–228.

"Low Bit Rate Video Coding Using Robust Motion Vector Regeneration in the Decoder" Mark R. Banham, James C. Brailean, Cheuk L. Chan, Aggelos K. Katsaggelos, IEEE Transactions on Image Processing, vol. 3, No. 5, Sep., 1994, pp. 652–665.

"An Asaptive Regularized Recursive Displacement Estimation Algorithm", Serafim N. Efstratiadis, Aggelos K. Katsaggelos, IEEE Transactions on Image Processing, vol. 2, No. 3, Jul, 1993, pp. 341–352.

"Image Segmentation Based on Object Oriented Mapping Parameter Extimation" Michael Hotter and Robert Thoma, Signal Processing 15 (1988) pp. 315–344.

":Object–Oriented Motion Estimation and Segmentation in Image Sequnces" Norbert Diehl, Signal Processing: Image Communications 3 (1990) pp. 23–56.

"Object–Oriented Analysis–Synthesis coding of Moving Images" Hans Georg Musmann, Michael Hotter and Jorn Ostermann, Signal Processing, Image Communications (1980) 117–135.

*Primary Examiner*—Howard W. Britton
*Attorney, Agent, or Firm*—Darleen J. Stockley

[57] ABSTRACT

The present invention provides a method and apparatus for detecting occluded areas in a video frame. A previous displacement vector field, DVF, is motion compensated (402) and used to provide an occlusion test parameter (404) which is compared to an optimal threshold (408) to detect occluded areas. The optimal threshold is calculated based on the previous DVF and a predetermined threshold (406).

23 Claims, 3 Drawing Sheets

100

200

300

METHOD AND APPARATUS FOR DETECTING OCCLUSION

FIELD OF THE INVENTION

The present invention relates generally to video coding, and more particularly to using occlusion detection in video coding.

BACKGROUND OF THE INVENTION

Very low bit rate, VLBR, coding of video necessitates the ultimate exploitation of implicit correlations present in images sequences in order to achieve targeted bit rates as low as 8 Kbits/sec, kbps. One of the most obvious correlations that all of today's codecs incorporate is the correlation of the intensity fields of two consecutive frames, i.e., the graceful motion of objects from one frame to another. The two most popular approaches to motion compensation are block-matching, BM, and spatio-temporal gradient techniques. While BM methods assume that all pixels in a given block move the same way, spatio-temporal gradient motion estimation algorithms minimize the displaced frame difference, DFD, at each pixel based on an initial estimate of the displacement vector field, DVF. One of the main differences between the two ME algorithms is that spatio-temporal gradient algorithms provide a dense vector field, i.e., one vector per pixel, while BM algorithms provide a coarse vector field, i.e., one vector per a block of pixels.

One of the important existing challenges of any type of motion compensation is the accurate representation and compensation of information in the occluded areas of the image. Occluded areas are defined as the areas a) where the background part of the scene is covered by a moving object, and b) where the background part of the scene is uncovered by a moving object. The two problems associated with occluded areas are the detection and the efficient transmission of information in these areas. Most of the existing codecs today fail in these areas due to either inaccurate detection or inefficient encoding of the information in these areas. For instance, motion compensated discrete cosine transform (DCT) coding schemes, such as those specified by H.261, MPEG1, and MPEG2, take the brute force approach in which the occluded areas are simply encoded as part the DFD. However, since the characteristics of these areas are quite different than that of the typical motion compensation failures, such as the failures around moving edges, the occluded areas are transmitted inefficiently in terms of both the bit rate and the reconstructed image quality. On the other hand, object-based coding schemes take the approach of detecting and encoding the information in the occluded areas as a separate process from the DFD encoding process. These schemes, however, suffer from the inefficient encoding of information since they require the transmission of the position overhead for these areas. This overhead can be very costly in achieving the target bit rates.

Currently, few approaches for the detection and transmission of the occluded area information in the context of very low bit rate coding have been reported. Most of the existing techniques take the approach of segmenting the scene into four regions; stationary background, moving object, covered background and uncovered background. According to these approaches, first a change detection mask is obtained based on two consecutive frames. Then motion estimation is performed resulting in a motion model for each object that is identified. Based on the change detection mask and the motion model the uncovered and covered regions are separated from the moving objects. However, these approaches have several disadvantages. First, either the position information of the detected occluded areas or the change detection mask along with the motion vectors must be transmitted over the channel in order for the decoder to generate the occlusion information according to the proposed algorithm. The position information, however, can be very costly depending on the amount of motion from one frame to another. Second, the proposed algorithms fail in detecting the uncovered areas in cases of sub-pixel motion since it simply considers the reverse motion in order to detect these areas. In order to get around that problem, for instance, backward motion estimation, i.e. from the current frame to the previous frame has been proposed; however, this process simply increases the computational expense substantially. Third, no consideration of the temporal continuity of motion between successive frames is incorporated into these algorithms. Fourth, such techniques tend to break down considerably in the presence of noise. Finally, these approaches make use of the intensity fields instead of the DVFs. However, this in turn can be the limiting factor in the performance of these approaches, since the characteristics of the occluded areas are captured more efficiently with the DVFs than the intensity fields due to the fact that occluded areas are inherently caused by inefficiencies in motion estimation and compensation.

Thus, there is a need for a method and apparatus for the accurate detection of occluded areas based on the DVF to achieve the desirable reconstructed image quality at targeted very low bit rates.

DETAILED DESCRIPTION OF PREFERRED EMBODIMENTS

A video sequence consists of temporally sampled projections of a three dimensional, 3-D, scene onto the two dimensional, 2-D, image plane. The 3-D motion that occurs within this scene is captured as 2-D displacements of these projections. The displacement of a particular picture element, pixel, in the current 2-D image plane, can be represented by a vector which points to the location of the particular pixel in a previous image plane. This vector is referred to as the displacement vector and is represented by the symbol $d_k(r)$, where the subscript k refers to the corresponding image frames acquired at time instants k and k−1. The vectors r and $d_k(r)$ contain horizontal, y, and vertical, x, components which span the two dimensional, 2-D, intensity frame using the upper left corner as the origin. The following notation is used for describing these vectors and their components, $$r=[x,y]^T$$

$$d_k(r)=[d_{x_k}(r),d_{y_k}(r)]^T.$$

The displacement vector field, DVF, describes the motion of all pixels between a given set of image planes, and therefore represents the 3-D motion of objects projected onto the image plane.

The present invention provides a method and apparatus for efficiently detecting occluded areas in a video frame. A previous DVF is used to provide an occlusion test parameter which is compared to an optimal threshold to detect occluded areas. By utilizing the previous DVF, this detection procedure can be performed in both the video encoder as well as the decoder, thus eliminating the requirement that the motion vectors be transmitted to the decoder.

Figure 1:
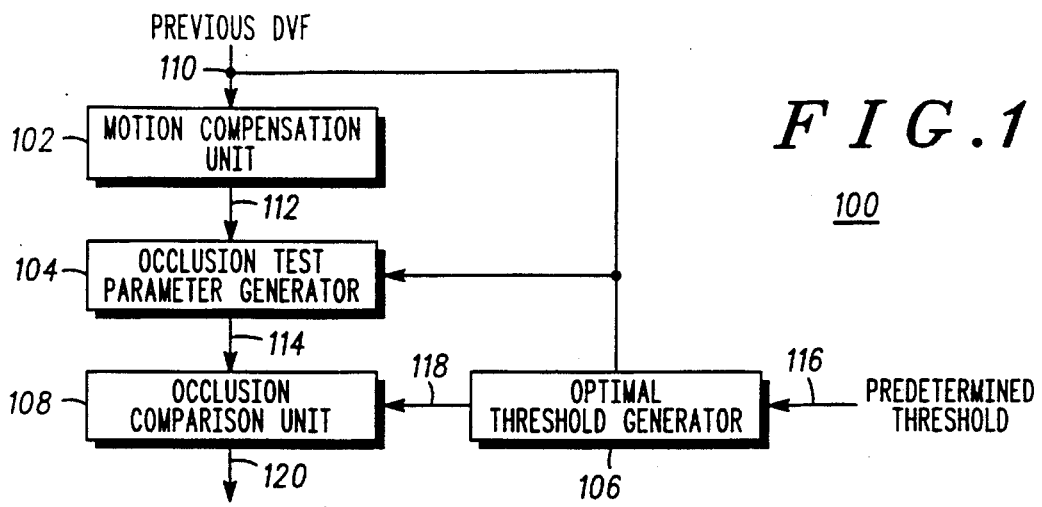
FIG. 1 is a block diagram of a preferred embodiment of an apparatus for detecting occlusion in accordance with the present invention.

FIG. 1, numeral 100, is a block diagram of a preferred embodiment of an apparatus for detecting an occlusion in accordance with the present invention. The apparatus comprises a motion compensation unit (102), an occlusion test parameter generator (104), an optimal threshold generator (106), and an occlusion comparison unit (108).

The motion compensation unit (102) receives the previous displacement vector field, DVF, (110) for providing a predicted DVF (112). The predicted DVF (112) is the previous DVF (110) motion compensated by itself and takes the form:

$$\hat{d}_k(r)=d_{k-1}(r-d_{k-1}(r))$$

or $$\hat{d}_{x_k}(r)=d_{x_{k-1}}(x-d_{x_{k-1}}(x,y),y-d_{y_{k-1}}(x,y))$$

$$\hat{d}_{y_k}(r)=d_{y_{k-1}}(x-d_{x_{k-1}}(x,y),y-d_{y_{k-1}}(x,y)),$$

where $d_{k-1}(r)$ is the previous DVF (110) and $\hat{d}_k(r)$ is the predicted DVF (112).

The occlusion test parameter generator (104) receives the previous DVF (110) and the predicted DVF (112) for calculating an occlusion test parameter (114) based on the difference between the previous DVF (110) and the predicted DVF (112). The occlusion test parameter (114) is the absolute value of the difference between the previous DVF and the predicted DVF given by the following formula for each component:

$$\Delta_x(r)=|\hat{d}_{x_k}(r)-d_{x_{k-1}}(r)|$$

$$\Delta_y(r)=|\hat{d}_{y_k}(r)-d_{y_{k-1}}(r)|$$

The optimal threshold generator (106) receives the previous DVF (110) and a predetermined threshold (116) for calculating an optimal threshold (118). The predetermined threshold (116) is equal to the ratio of the probability that a point in a video frame is stationary to the probability that it belongs to a moving object. The optimal threshold, $\tau_i$, (118) for each component, i, is given by the following formula:

$$\tau_i = \left[ \frac{\sigma_{d_i}^2 \sigma_{g_i}^2}{\sigma_{g_i}^2 - \sigma_{d_i}^2} \ln \left\{ \frac{\sigma_{g_i}^2}{\sigma_{d_i}^2} T_i \right\} \right]$$

-continued
$$i = \{x,y\}$$

where $T_i$ is the predetermined threshold (116), $\sigma_{d_i}^2$ is a local variance, and $\sigma_{g_i}^2$ is a global variance for each component.

The local variance is calculated for each component using the following formula:

$$\sigma_{d_i}^2(r) = \frac{1}{(2A+1)(2B+1)} \sum_{m=-A}^{A} \sum_{n=-B}^{B} (d_{k-1}(i-m,j-n) - m_d(i-m,j-n))^2$$

where A and B define a predetermined local neighborhood of a pixel. The local neighborhood extends from B pixels to the left of pixel (i,j) to B pixels to the right and from A pixels below to A pixels above.

The local mean, $m_{d_i}$, for each component is given by:

$$m_{d_i}(r) = \frac{1}{(2A+1)(2B+1)} \sum_{m=-A}^{A} \sum_{n=-B}^{B} d_{k-1}(i-m,j-n).$$

where m and n are integers.

The global variance is calculated using the following formula:

$$\sigma_{g_i}^2(r) = \frac{1}{M \times N} \sum_{m=0}^{M-1} \sum_{n=0}^{N-1} (d_{k-1}(i-m,j-n) - m_g(i-m,j-n)),$$

where M and N define the boundaries of the entire predetermined intensity frame.

The global mean, $m_{g_i}$, for each component is given by:

$$m_{g_i}(r) = \frac{1}{M \times N} \sum_{m=0}^{M-1} \sum_{n=0}^{N-1} d_{k-1}(i-m,j-n).$$

The occlusion comparison unit (108) receives the occlusion test parameter (114) and the optimal threshold (118) to determine a presence of occlusion (120). Occlusion is detected when the occlusion test parameter (114) is greater than the optimal threshold (118).

Figure 2:
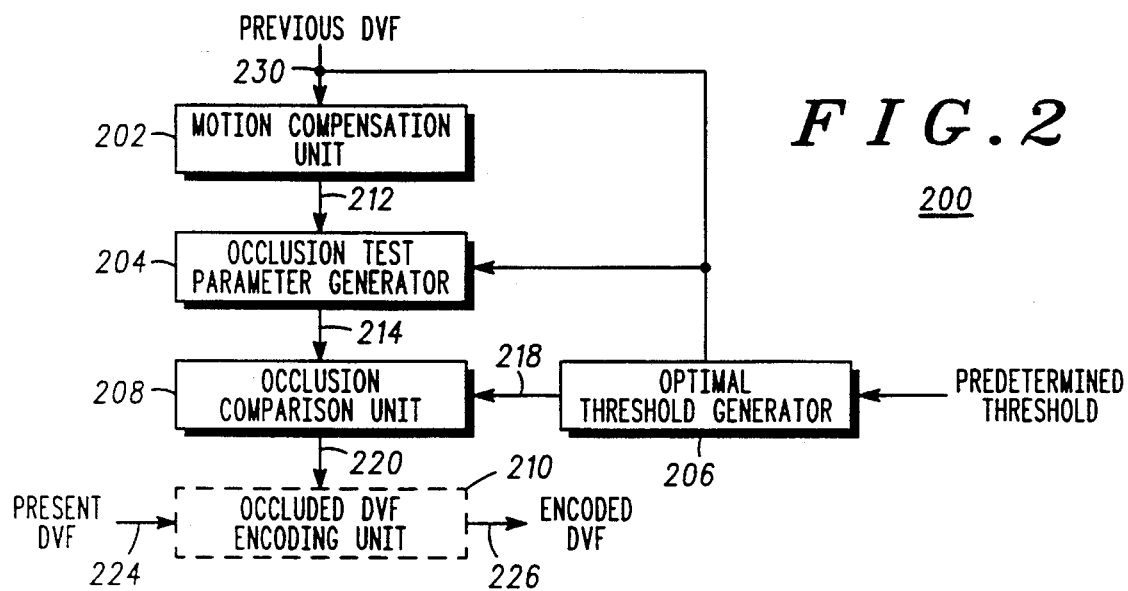
FIG. 2 is a block diagram of a preferred embodiment of an apparatus for detecting occlusion and encoding the effected area in accordance with the present invention.

FIG. 2, numeral 200, is a block diagram of a preferred embodiment of an apparatus for detecting an occlusion, coupled to a occlusion. DVF encoder, in accordance with the present invention. The apparatus comprises a motion compensation unit (202), an occlusion test parameter generator (204), an optimal threshold generator (206), an occlusion comparison unit (208), and an occlusion DVF encoder (210). The motion compensation unit (202), occlusion test parameter generator (204), optimal threshold generator (206), and occlusion comparison unit (208) operate as described above. The detected occlusion areas (220) are provided to the occlusion DVF encoder (210) along with the present DVF (224). The motion vectors contained in the present DVF (224) that correspond to the occluded areas (220) are encoded using entropy encoding and transmitted over the channel to the corresponding decoder unit (310).

Figure 3:
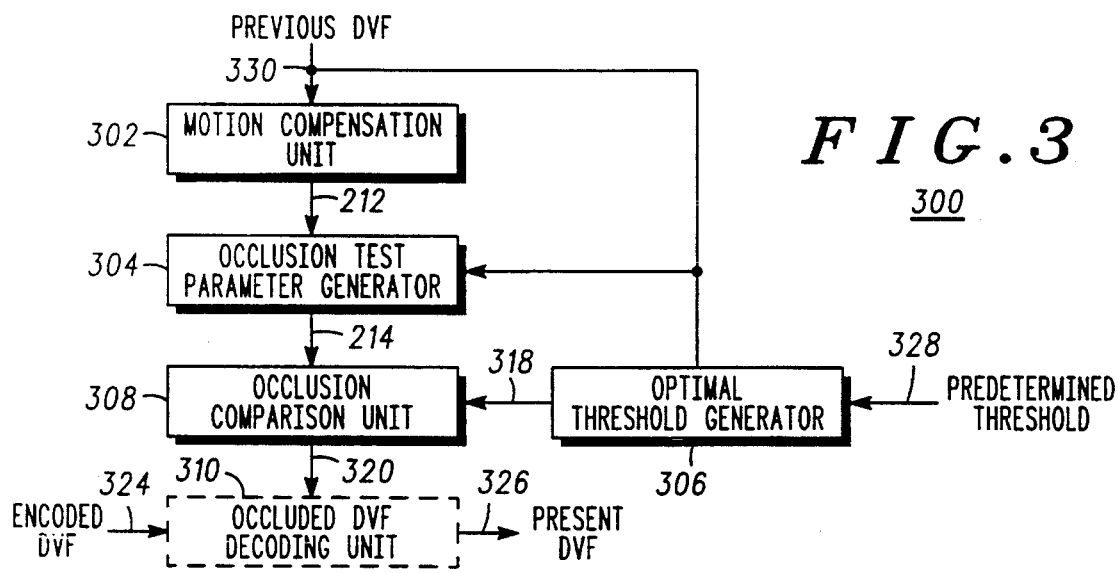
FIG. 3 is a block diagram of a preferred embodiment of an apparatus for detecting occlusion and decoding the effected area in accordance with the present invention.

FIG. 3, numeral 300, is a block diagram of a preferred embodiment of an apparatus for detecting an occlusion, coupled to a occlusion DVF encoder, in accordance with the present invention. The apparatus comprises a motion compensation unit (302), an occlusion test parameter generator (304), an optimal threshold generator (306), an occlusion comparison unit (308), and an occlusion DVF decoder (310). The motion compensation unit (302), occlusion test parameter generator (304), optimal threshold generator (306), and occlusion comparison unit (308) operate as described above. The detected occlusion areas (320) are provided to the occlusion DVF decoder (310) along with the encoded DVF (324). The motion vectors contained in the encoded DVF (324) are decoded an placed into the corresponding occluded areas (320).

Figure 4:
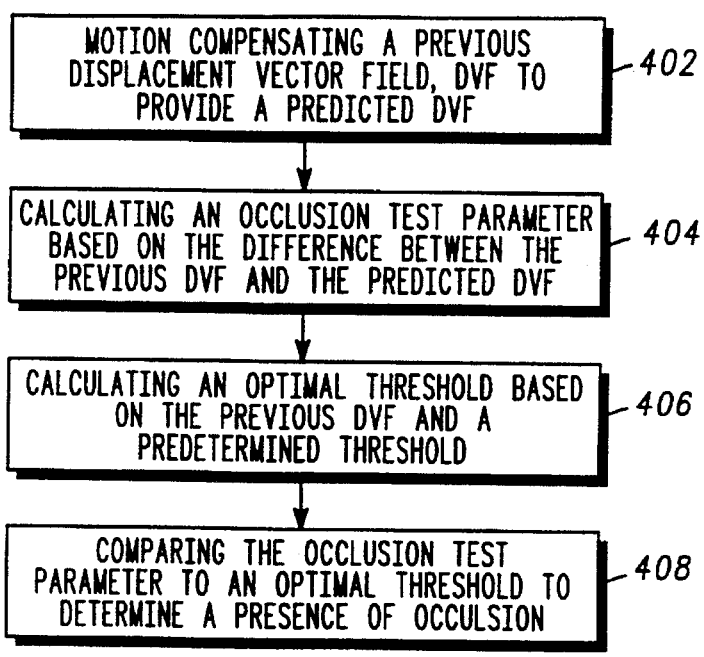
FIG. 4 is a flow diagram of a preferred embodiment of steps of a method for detecting occlusion in accordance with the present invention.

FIG. 4, numeral 400, is a flow diagram of a preferred embodiment of steps of a method for detecting occlusion in accordance with the present invention. The first step is motion compensating a previous displacement vector field, DVF, to provide a predicted DVF (402). The next step is calculating an occlusion test parameter based on the difference between the previous DVF and the predicted DVF (404). The occlusion test parameter is the absolute value of the difference between the previous DVF and the predicted DVF. At any time prior to the next step an optimal threshold based on the previous DVF and a predetermined threshold is calculated. (406). The optimal threshold includes calculating a local variance of the previous DVF and a global variance of the previous DVF. Then the occlusion test parameter is compared to an optimal threshold to determine a presence of occlusion (408).

Figure 5:
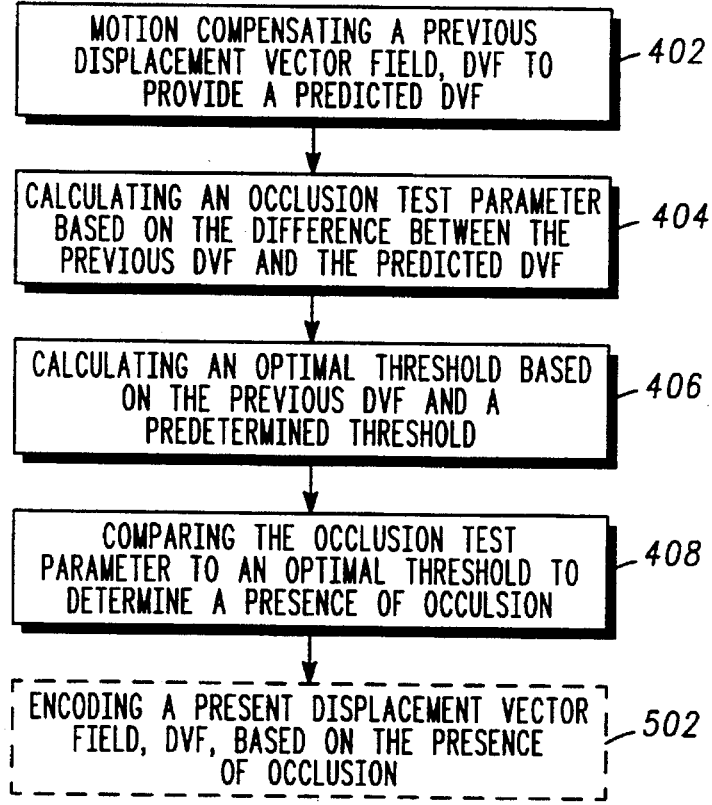
FIG. 5 is a flow diagram of a preferred embodiment of steps of a method for detecting occlusion and encoding the effected area in accordance with the present invention.

FIG. 5, numeral 500, is a flow diagram of a preferred embodiment of steps of a method for detecting occlusion in accordance with the present invention. The first step is motion compensating a previous displacement vector field, DVF, to provide a predicted DVF (402). The next step is calculating an occlusion test parameter based on the difference between the previous DVF and the predicted DVF (404). The occlusion test parameter is the absolute value of the difference between the previous DVF and the predicted DVF. At any time prior to the next step an optimal threshold based on the previous DVF and a predetermined threshold is calculated. (406). The optimal threshold includes calculating a local variance of the previous DVF and a global variance of the previous DVF. Then the occlusion test parameter is compared to an optimal threshold to determine a presence of occlusion (408). As a final step, the motion vectors from the present DVF contained in the areas determined to be occlusions are encoded are transmitted to the decoder (502).

Figure 6:
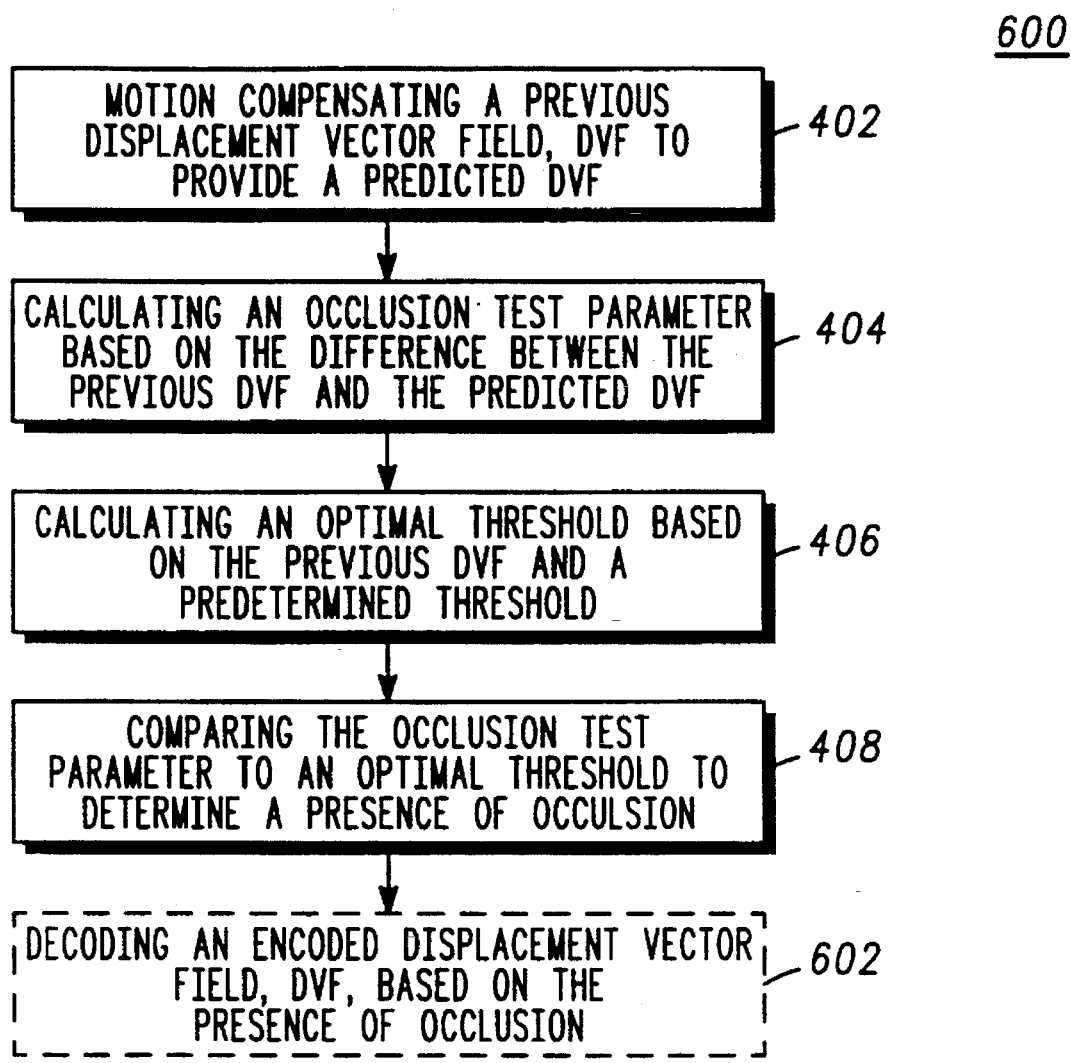
FIG. 6 is a flow diagram of a preferred embodiment of steps of a method for detecting occlusion and decoding the effected area in accordance with the present invention.

FIG. 6, numeral 600, is a flow diagram of a preferred embodiment of steps of a method for detecting occlusion and decoding the effected pixels in accordance with the present invention. The first step is motion compensating a previous displacement vector field, DVF, to provide a predicted DVF (402). The next step is calculating an occlusion test parameter based on the difference between the previous DVF and the predicted DVF (404). The occlusion test parameter is the absolute value of the difference between the previous DVF and the predicted DVF. At any time prior to the next step an optimal threshold based on the previous DVF and a predetermined threshold is calculated (406). The optimal threshold includes calculating a local variance of the previous DVF and a global variance of the previous DVF. Then the occlusion test parameter is compared to an optimal threshold to determine a presence of occlusion (408). As a final step, the motion vectors sent from the encoder are decoded and place in the areas determined to be occlusions (602).

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for detecting occlusion, comprising:

motion compensating, using a motion compensator, a previous displacement vector field (DVF) to provide a predicted DVF;

calculating an occlusion test parameter, using an occlusion test parameter generator, based on a difference between the previous DVF and the predicted DVF;

calculating an optimal threshold, using an optimal threshold generator, based on the previous DVF and a predetermined threshold; and comparing, using an occlusion comparison unit, the occlusion test parameter to an optimal threshold to determine a presence of occlusion.

2. The method according to claim 1, wherein the occlusion test parameter is an absolute value of the difference between the previous DVF and the predicted DVF.

3. The method according to claim 1, wherein calculating the optimal threshold includes calculating a local variance of the previous DVF and a global variance of the previous DVF.

4. The method according to claim 1, wherein the occlusion test parameter and the optimal threshold are compared.

5. The method according to claim 1, further comprising encoding a present displacement vector field, DVF, based on the presence of occlusion.

6. The method according to claim 1, further comprising decoding an encoded displacement vector field, DVF, based on the presence of occlusion.

7. The method of claim 1 wherein the steps of the method are embodied in a tangible medium of/for a Digital Signal Processor, DSP.

8. The method of claim 1 wherein the steps of the method are embodied in an Application Specific Integrated Circuit, ASIC.

9. The method of claim 1 wherein the steps of the method are embodied in a gate array.

10. The method of claim 1 wherein the steps of the method are embodied in a tangible medium of/for a computer.

11. The method of claim 10 wherein the tangible medium is a computer diskette.

12. The method of claim 10 wherein the tangible medium is a memory unit of the computer.

13. An apparatus for detecting occlusion, comprising:

a motion compensation unit, operably coupled to receive a previous displacement vector field (DVF) for providing a predicted DVF;

an occlusion test parameter generator, operably coupled to receive the previous DVF and operably coupled to the motion compensation unit, for calculating an occlusion test parameter based on a difference between the previous DVF and the predicted DVF;

an optimal threshold generator, operably coupled to receive the previous DVF and a predetermined threshold, for calculating an optimal threshold; and an occlusion comparison unit, operably coupled to the occlusion test parameter generator and the optimal threshold generator, for comparing the occlusion test parameter to an optimal threshold to determine a presence of occlusion.

14. The apparatus according to claim 13, wherein the occlusion test parameter is an absolute value of the difference between the previous DVF and the predicted DVF.

15. The apparatus according to claim 13, wherein the optimal threshold generator includes a local variance calculator and a global variance calculator.

16. The apparatus according to claim 13, further comprising an occluded DVF encoding unit, coupled to the occlusion comparison unit, for encoding a present displacement vector field, DVF, based on the presence of occlusion.

17. The apparatus according to claim 13, further comprising an occluded DVF encoding unit, coupled to the occlusion comparison unit, for decoding an encoded displacement vector field, DVF, based on the presence of occlusion.

18. The apparatus of claim 13 wherein the apparatus is embodied in a tangible medium of/for a Digital Signal Processor, DSP.

19. The apparatus of claim 13 wherein the apparatus is embodied in an Application Specific Integrated Circuit, ASIC.

20. The apparatus of claim 13 wherein the apparatus is embodied in a gate array.

21. The apparatus of claim 13 wherein the apparatus is embodied in a tangible medium of/for a computer.

22. The apparatus of claim 21 wherein the tangible medium is a computer diskette.

23. The apparatus of claim 21 wherein the tangible medium is a memory unit of the computer.

* * * * *

UNITED STATES PATENT AND TRADEMARK OFFICE
CERTIFICATE OF CORRECTION

PATENT NO. : 5,612,745
DATED : March 18, 1997
INVENTOR(S) : Taner Ozcelik, James C. Brailean, and Aggelos Katsaggelos It is certified that error appears in the above-indentified patent and that said Letters Patent is hereby corrected as shown below:

On the title page, item [73]:

--Assignee: Motorola, Inc., Schaumburg, IL and Northwestern University, Evanston, IL--

Signed and Sealed this

Twenty-first Day of April, 1998

Attest:

BRUCE LEHMAN

*Attesting Officer*   *Commissioner of Patents and Trademarks*